(12) United States Patent
Ray et al.

(10) Patent No.: US 10,519,849 B2
(45) Date of Patent: Dec. 31, 2019

(54) AIRCRAFT INTERCOOLER SYSTEM AND METHOD

(71) Applicant: CONTINENTAL MOTORS, INC., Mobile, AL (US)

(72) Inventors: James C. Ray, Birmingham, AL (US); Michael T. Schaner, West Chester, OH (US)

(73) Assignee: Continental Motors, Inc., Mobile, AL (US)

( * ) Notice: Subject to any disclaimer, the term of this patent is extended or adjusted under 35 U.S.C. 154(b) by 402 days.

(21) Appl. No.: 15/280,456

(22) Filed: Sep. 29, 2016

(65) Prior Publication Data
US 2017/0016386 A1    Jan. 19, 2017

Related U.S. Application Data

(63) Continuation of application No. 13/827,043, filed on Mar. 14, 2013, now Pat. No. 9,482,146.

(51) Int. Cl.
*F02B 29/04*    (2006.01)
*F02B 37/12*    (2006.01)
(Continued)

(52) U.S. Cl.
CPC ...... *F02B 29/0493* (2013.01); *F02B 29/0406* (2013.01); *F02B 29/0418* (2013.01);
(Continued)

(58) Field of Classification Search
CPC ............. F02B 29/0493; F02B 29/0406; F02B 29/0418; F02B 29/0475; F02B 37/00; F02B 37/12; F02B 37/16; F02B 37/18; F02B 37/183; F02D 41/0007; F28F 27/02; F28F 2250/06; Y02T 10/144; Y02T 10/146
(Continued)

(56) References Cited

U.S. PATENT DOCUMENTS 3,712,282 A * 1/1973 Isley .................. F02B 29/0418
                                                      123/563
4,774,858 A * 10/1988 Ganoung .............. B60W 10/06
                                                      477/100
(Continued)

OTHER PUBLICATIONS

Ray, James C.; Issue Notification for U.S. Appl. No. 13/827,043, filed Mar. 14, 2013, dated Oct. 12, 2016, 1 pg.
(Continued)

*Primary Examiner* — Phutthiwat Wongwian
*Assistant Examiner* — Loren C Edwards
(74) *Attorney, Agent, or Firm* — Donald R. Andersen; Bradford R. Czerwonky

(57) ABSTRACT

A heat exchanger for an engine includes: an inlet; an outlet; a radiator spanning the inlet and the outlet and in fluid communication with both the inlet and the outlet; and a bypass element spanning the inlet and the outlet and in fluid communication with both the inlet and the outlet and in parallel fluid communication with the radiator, the bypass element including a control mechanism, the control mechanism including a bypass valve and a control cylinder connected to the bypass valve for operating the bypass valve, the control cylinder including a pneumatic ram cylinder in communication with a turbocharger outlet of the engine.

23 Claims, 3 Drawing Sheets

(51) Int. Cl.
*F28F 27/02* (2006.01)
*F02B 37/00* (2006.01)
*F02D 41/00* (2006.01)

(52) U.S. Cl.
CPC .......... *F02B 29/0475* (2013.01); *F02B 37/00* (2013.01); *F02B 37/12* (2013.01); *F02D 41/0007* (2013.01); *F28F 27/02* (2013.01); *F28F 2250/06* (2013.01); *Y02T 10/144* (2013.01); *Y02T 10/146* (2013.01)

(58) Field of Classification Search
USPC ........................................................ 123/563
See application file for complete search history.

(56) References Cited

U.S. PATENT DOCUMENTS

| | | |
|---|---|---|
| 5,669,363 A | 9/1997 | Francis |
| 9,482,146 B1 | 11/2016 | Ray |
| 2003/0234009 A1 | 12/2003 | Kennedy et al. |
| 2005/0028796 A1 | 2/2005 | Tussing et al. |
| 2005/0081523 A1 | 4/2005 | Breitling et al. |
| 2011/0289919 A1 | 12/2011 | Oyagi et al. |

OTHER PUBLICATIONS

Ray, James C.; Examiner Interview Summary for U.S. Appl. No. 13/827,043, filed Mar. 14, 2013, dated Mar. 25, 2016, 3 pgs.
Ray, James C.; Non-Final Office Action for U.S. Appl. No. 13/827,043, filed Mar. 14, 2013, dated Dec. 17, 2014, 13 pgs.
Ray, James C.; Notice of Allowance for U.S. Appl. No. 13/827,043, filed Mar. 14, 2013, dated Jul. 1, 2016, 9 pgs.
Article entitled: "Turbo Tech 101 (Basic)," located at <https://web.archive.org/web/20110901000000*/https://turbobygarrett.com/turbobygarrett/sites/default/files/PDF/Turbo%20Tech%20101.pdf>, publicly available prior to Mar. 14, 2012, 7 pgs.
Ray, James C.; Final Office Action for U.S. Appl. No. 13/827,043, filed Mar. 14, 2013, dated Jul. 1, 2015, 16 pgs.

* cited by examiner

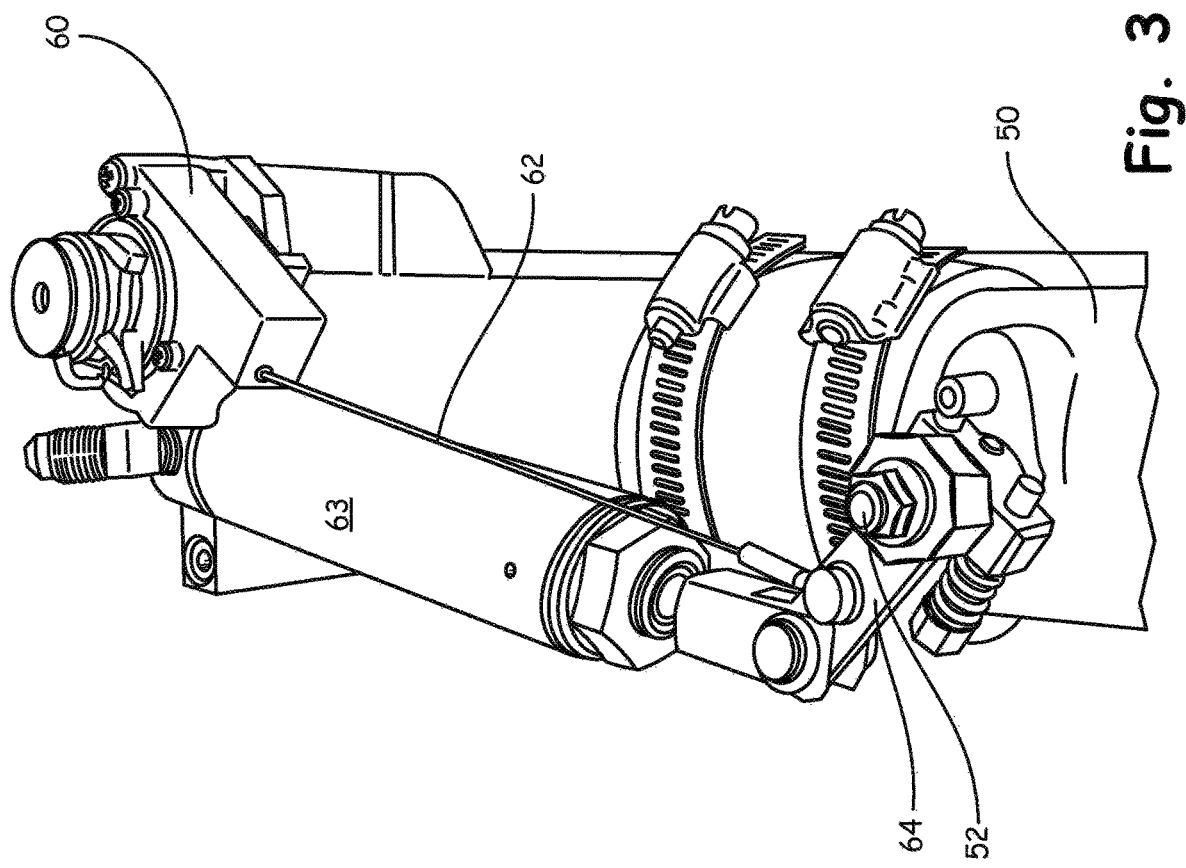

AIRCRAFT INTERCOOLER SYSTEM AND METHOD

CROSS-REFERENCE TO RELATED APPLICATIONS

This application is a continuation of U.S. application Ser. No. 13/827,043, filed on Mar. 14, 2013, which is hereby specifically incorporated by reference herein in its entirety.

BACKGROUND

Field of Use

The present disclosure is directed to an intercooler system for a piston aircraft engine and a method of optimizing aircraft engine performance.

Related Art

Piston aircraft engines are widely used in light aircraft. Like similar engines in ground transportation systems, piston aircraft engines use cylinder compression as the basis for achieving output power. Unlike engines used in ground transportation systems, engines used in aircraft are subject to rapid temperature changes and extremes that are rarely encountered on the ground. Likewise, aircraft are obviously subject to much higher reliability requirements.

Compression ignition engines, often referred to as diesel engines, typically have no spark ignition device but ignite their fuel in response to a combination of factors including compression, fuel type, fuel concentration/richness, temperature, and air pressure, amongst other factors. It will be appreciated that many of these factors, most particularly air pressure and temperature, will vary during flight.

If manifold pressure and thus cylinder pressure drops too low, there will be power loss, which can limit the desired performance in flight. To improve engine performance under these conditions, turbocharging can be used to increase pressure, but turbocharging uses exhaust gasses to drive the turbine, and when engine power is reduced, such as during descent, there may not be energy to drive the turbo charger to maintain manifold pressure adequate to ensure combustion. Yet reserve power may be critical in descent. Increasing engine power and thus turbocharging would solve that problem. In descent, however, power is not normally increased. Alternatively, one could supply electrical heating to the manifold air on descent, but this solution would require massive batteries and thus negatively affect performance. So these solutions are impractical.

The present disclosure addresses both of these problems with an innovative solution.

SUMMARY

The following summary is intended to assist the reader in understanding the full disclosure and the claims. The claims, not this summary, define the scope of the invention. The present disclosure relates to a system and apparatus for regulating induction air temperature in an aircraft internal combustion engine having a turbocharger, comprising:
- a heat exchanger configured to receive air from the turbocharger; said heat exchanger including an inlet and an outlet, a pair of spaced-apart headers with the inlet in fluid communication with one header and the outlet in communication with the other header, a radiator spanning the headers and in fluid communication with both headers, a bypass element likewise spanning said headers and in fluid communication therewith and in parallel fluid communication with said radiator; said bypass element having a lower fluid resistance than said radiator when in a fully open configuration;
- said bypass element including a control mechanism, the control mechanism including a bypass valve, the control mechanism configured to vary the flow of fluid through the bypass element by operating said bypass valve; and
- a fluid link between the output of the turbocharger and the control mechanism for operating the control mechanism in response to changes in the fluid pressure in the fluid link;
- said control mechanism being configured to increasingly open said bypass valve when the pressure in said fluid link is decreasing, therefore causing fluid to bypass the radiator and be delivered to the engine without heat loss which would result if passed through the radiator.

Also disclosed is a heat exchanger configured to receive air from the turbocharger; said heat exchanger including an inlet and an outlet, a pair of spaced-apart headers with the inlet in fluid communication with one header and the outlet in communication with the other header, a radiator spanning the headers and in fluid communication with both headers, a bypass element likewise spanning said headers and in fluid communication therewith and in parallel fluid communication with said radiator;
- said bypass element including a control mechanism, the control mechanism including a bypass valve configured to vary the flow of fluid through the bypass element and a control cylinder connected to said bypass valve for operating said bypass valve; and
- a sensor to measure a parameter from the following: air pressure, manifold pressure, and air temperature;
- said control mechanism configured to receive data on said parameter from the sensor and translate such data to control the operation of the bypass valve in response to changes in said parameter;
- said control mechanism being configured to tend to open said bypass valve when said parameter is decreasing, therefore causing fluid to bypass the radiator and be delivered to the engine without heat loss which would result if passed through the radiator.

Also disclosed is a method of maintaining power to an internal combustion aircraft engine when the aircraft is in descent, the engine including a turbocharger and an intake manifold; comprising the steps of:
- locating a radiator in series between the output of the turbocharger and the input of the intake manifold;
- locating a bypass element in parallel with the radiator; the bypass element having a lower fluid resistance than said radiator when in a fully open configuration;
- locating a bypass valve in series with said bypass element, so that said bypass element and said bypass valve are in series with each other and together in parallel with said radiator;
- periodically measuring a parameter from the following group: manifold pressure, turbocharger output pressure, turbocharger output temperature, manifold temperature, and radiator input temperature;
- translating said periodic parameter measurement into an input to a control mechanism; and
- using said control mechanism to tend to open said bypass valve when said parameter is falling between periodic measurements and to tend to close said bypass valve when the parameter is increasing;
- whereby the amount of fluid passing through the bypass element is increased when the bypass valve is open so that fluid delivered to the manifold will suffer less heat loss and result in greater manifold pressure.

Also disclosed is a system for regulating engine power, the system comprising:
a heat exchanger configured to receive air input from a turbocharger of an engine, the heat exchanger comprising:
an inlet;
an outlet;
a radiator spanning the inlet and the outlet;
a bypass element spanning the inlet and the outlet and in fluid communication with both the inlet and the outlet and in parallel fluid communication with the radiator, the bypass element comprising a control mechanism configured to vary the flow of fluid through the bypass element; the control mechanism comprising a control cylinder and a bypass valve, the control cylinder comprising a pneumatic ram cylinder; and
a fluid link positioned between an output of the turbocharger and the control mechanism, the fluid link being a passage in fluid communication with both the output of the turbocharger and the control mechanism, the control cylinder of the control mechanism configured to operate the bypass valve of the control mechanism when a fluid pressure in the fluid link changes.

Also disclosed is a heat exchanger for an engine, the heat exchanger comprising:
an inlet;
an outlet;
a radiator spanning the inlet and the outlet and in fluid communication with both the inlet and the outlet; and
a bypass element spanning the inlet and the outlet and in fluid communication with both the inlet and the outlet and in parallel fluid communication with the radiator, the bypass element comprising a control mechanism, the control mechanism comprising a bypass valve and a control cylinder connected to the bypass valve for operating the bypass valve, the control cylinder comprising a pneumatic ram cylinder in communication with a turbocharger outlet of the engine.

Also disclosed is a method of using an engine, the method comprising:
opening a bypass valve of a bypass element of a heat exchanger of the engine in response to a decrease in a fluid pressure in a fluid link located between an output of a turbocharger of the engine and a control mechanism of the bypass element, the control mechanism comprising a pneumatic ram cylinder, the fluid pressure in the fluid link equal to a turbocharger outlet pressure; and
closing the bypass valve in response to an increase in the fluid pressure in the fluid link.

BRIEF DESCRIPTION OF THE DRAWINGS

FIG. 3 is a close-up fragmentary view of a portion of a bypass element, a bypass valve, and an optional position sensor of the system.

DETAILED DESCRIPTION

Figure 1:
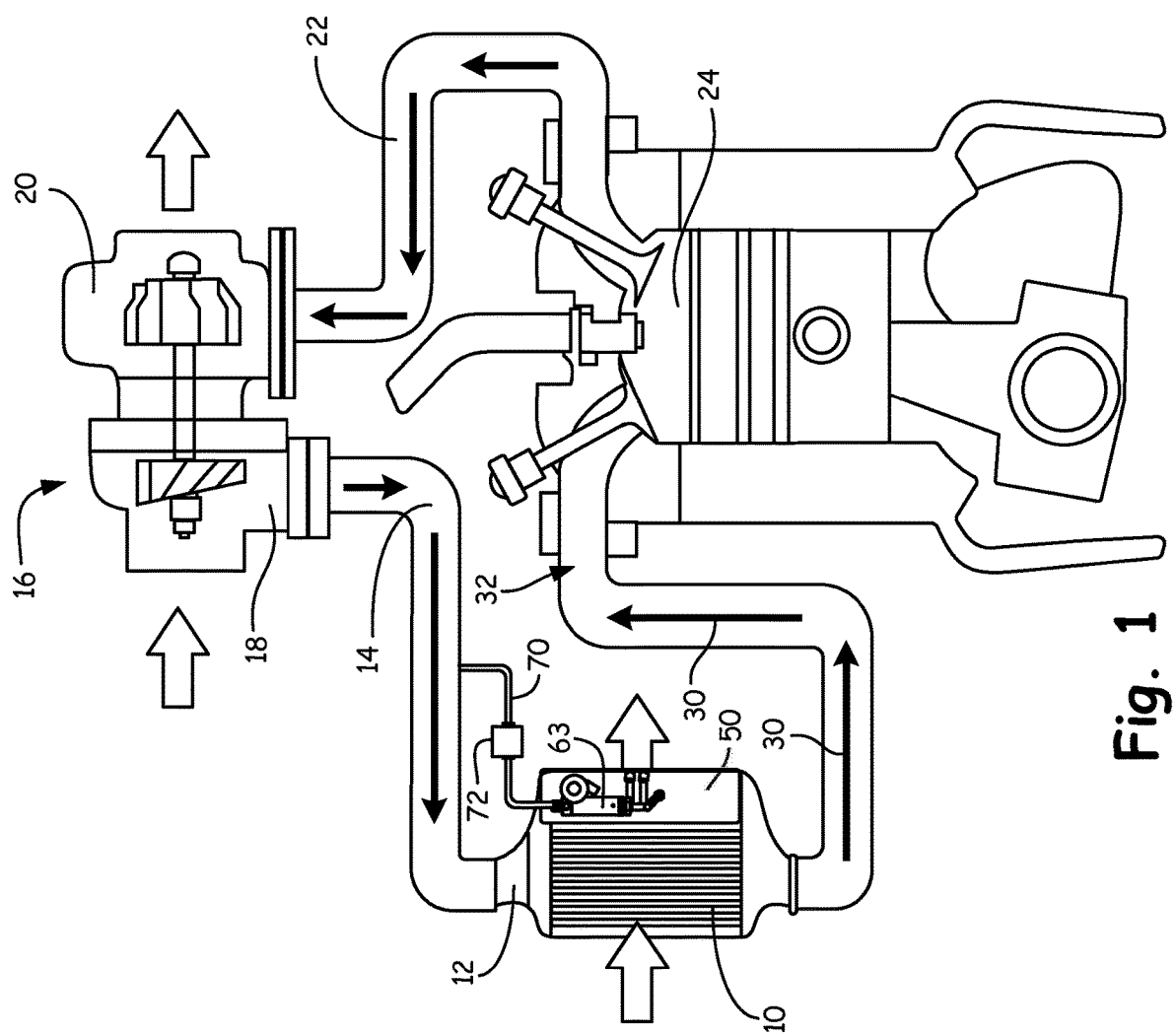
FIG. 1 is a schematic view of a system for regulating power in an engine including a turbocharger and a heat exchanger according to this disclosure.

The present disclosure provides a system and method of dynamically monitoring a parameter of aircraft engine performance and responsively adjusting the flow through a bypass element—alternately described in various embodiments as a channel, circumventing all or part of a radiator in order to maintain manifold pressure in an aircraft internal combustion engine.

As mentioned above, it is important to provide sufficient manifold temperature and thus aid in achieving combustion air to the cylinders of an internal combustion compression ignited aircraft engine (i.e. diesel style—compression combustion). There are many parameters which can be monitored to determine manifold pressure including, but not limited to the following: manifold pressure, turbocharger output pressure, turbocharger output temperature, manifold temperature, heat exchanger pressure, and heat exchanger temperature, etc. These parameters can all provide indications of manifold pressure when their values are translated into a manifold equivalent. Thus the present disclosure contemplates the use of any or all of these parameters but will specifically discuss pressure sensing for the sake of brevity.

Some aircraft have heat exchangers to reduce the temperature of the turbocharger output air, but temperature reduction is not always desirable. Typical temperatures at the turbocharger outlet are 300-500 degrees Fahrenheit (F.) under full power but can drop to ambient temperature during descent. Coupled with −50 degree F. or colder ambient air, the temperature of air exiting the heat exchanger can drop below ambient temperature. Since temperature drop also causes a drop in air pressure, measurements of the one can be translated to the other with appropriate adjustment for other factors. Thus in areas of the disclosure referencing only temperature, pressure should be considered interchangeable therewith. In non-turbocharged engines, intake air can be warmed by engine heat and similar results can occur though not as dramatically.

During low-power periods, descent, strong tail wind, etc., the engine and thus the turbocharger/compressor is running at a lower RPM. This naturally results in lower manifold pressure. If the outside ambient temperature is also particularly low, combustion may be reduced or may not occur and therefore engine operation may be adversely affected. So an aircraft landing in cold weather at a high-altitude airport would represent an extreme case of bad circumstance where lack of combustions or drop in manifold pressure might stall the engine during landing. Notice that this circumstance is easily overcome in land vehicles by merely downshifting when descending, and in any event power losses are not catastrophic. This solution is not available for aircraft.

Because an aircraft system must have extremely high reliability, it is particularly important that the solution to this problem be as simple as possible and, if possible, not add significantly to the weight of the aircraft.

The solution set forth below, in one embodiment, provides a simple and lightweight yet reliable system and method to maintain manifold temperature by using the turbocharger output pressure to control the amount of air which is either sent through or else bypassed around a radiator. In general, if the turbocharger pressure drops, it becomes desirable to bypass the radiator in order to maintain manifold temperature as high as reasonably possible. If the air is not diverted around the radiator, in whole or in part, the drop in air temperature can result in lack of combustion (i.e. the engine not running).

FIG. 1 schematically illustrates a system according to the present disclosure where a heat exchanger 10 includes an inlet 12, the inlet 12 connected to an outlet 14 of a turbocharger 16 on a fresh air side 18 of the turbocharger 16, and an exhaust air side 20 of a turbocharger 16 is being driven by combustion exhaust 22 from a combustion chamber 24 defined by a piston, a cylinder, and valves. Output air 30 from the heat exchanger 10 is fed into a manifold 32 which supplies combustion air to the cylinder (or cylinders in the case of more than one cylinder).

Figure 2:
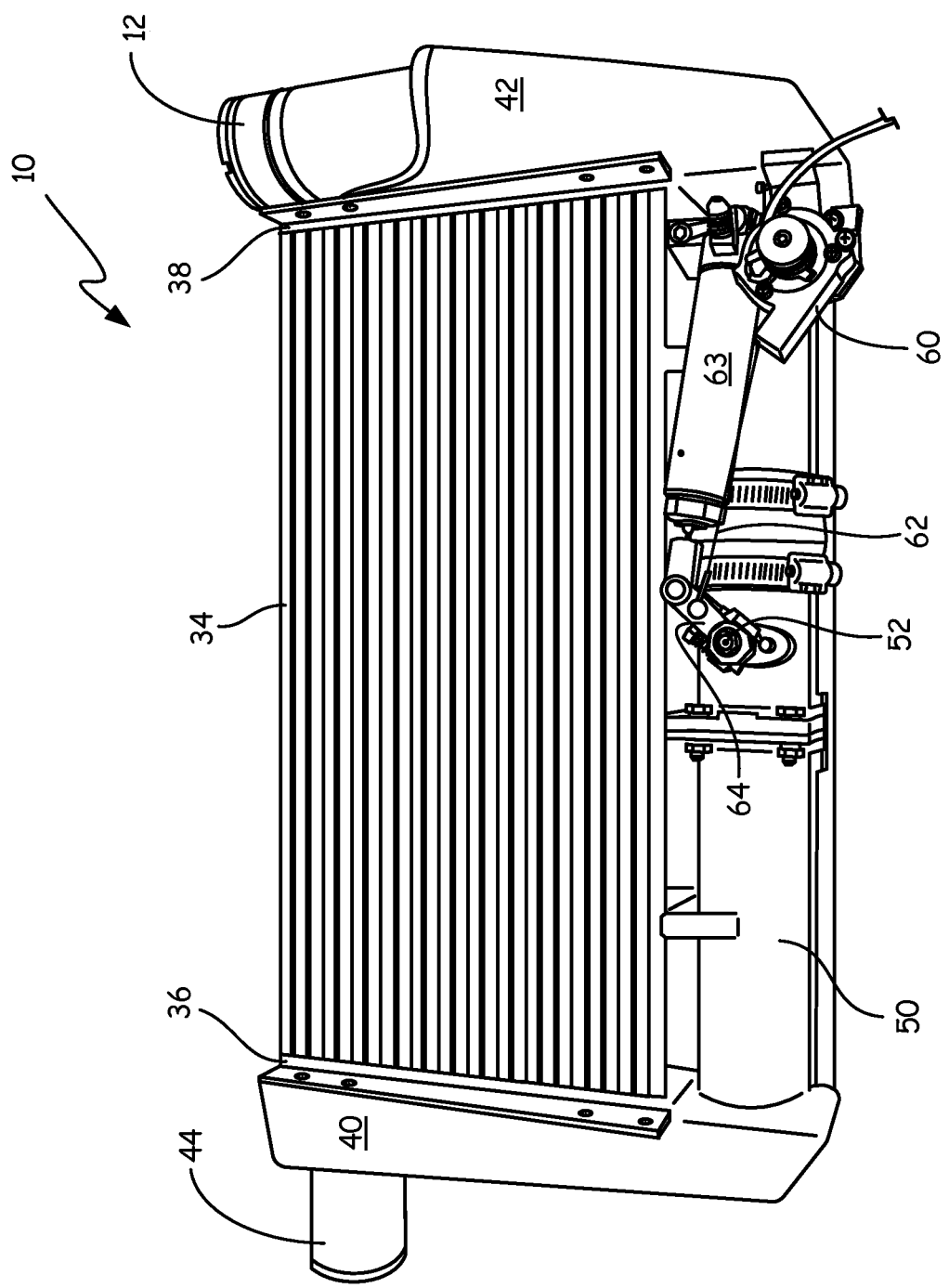
FIG. 2 is a perspective view of the heat exchanger.

FIG. 2 provides a close up of the heat exchanger 10 which has several components. The core of the heat exchanger 10 is a radiator 34, which is known in the art. The radiator 34 has a plurality of lateral fluid passages and provides for ambient air flow roughly orthogonally to the lateral passages. It is the ambient air which cools the fluid in the lateral passages.

At a pair of open ends 36,38, the radiator 34 has a pair of headers 40,42, respectively, attached. The headers 40,42 perform the function of channeling the air from the turbocharger 16 into the heat exchanger 10 via the inlet 12 and the header 42, and out of the heat exchanger 10 via the outlet 44.

Located between the headers 40,42 is a bypass element 50—alternately described as a tube or passage—which provides a passage from the inlet 12 to the outlet 44, largely bypassing the radiator 34. Thus the header 42 supplies fluid to the bypass element 50 and the radiator 34 simultaneously. If neither the radiator 34 nor the bypass element 50 is obstructed, however, fluid will naturally pass largely through the bypass element 50 because the bypass element is selected or sized to have a lower fluid resistance end to end when fully open than that of the radiator 34. Consequently, very little heat will be lost by the fluid during its lateral passage between the headers. Of course, in normal operation, it is desirable to use the radiator to cool the induction air, providing a more dense air charge for efficient and powerful combustion; but for those cases when cooler induction air and a more dense air charge is not desirable, the system monitors the pressure and/or the temperature at any of a number of points (outlet 14 of turbocharger 16, inlet 12 of heat exchanger 10, inlet of manifold 32, etc.) to determine when heat retention and thus bypass is needed.

Control of the bypass function is achieved by a known type of control mechanism 63—alternately described as a control or a valve mechanism. For example, control mechanism 63 can include a throttle valve having an armature/shaft with a circular or oval rotatable flow-controlling plate (not shown) which, by rotation of the shaft 52 by ninety degrees, will open or shut the bypass element 50. The bypass valve of control mechanism 63 is preferably controlled by a pneumatic ram cylinder of control mechanism 63. In addition to control of the bypass element by control mechanism 63, a position sensor 60 can be used as an additional check of the operation of the bypass. Such sensors are known in the art, such as those of model series LX-PA from UniMeasure, Corvallis, Oreg., USA. The position sensor 60 has a wire 62 attached to a lever arm 64 on the shaft 52. The position data can provide a check for a pilot of the aircraft to be sure the bypass is, in fact, in the correct position. It can also be used as part of an automated system as explained below.

In operation, power to the internal combustion aircraft engine is maintained by controlling the temperature and/or the pressure of the fluid (air or air-fuel mix) reaching the manifold 32 and thus the cylinder(s). The radiator 34 is installed in series between the output 14 of the turbocharger 16 and the input of the manifold 32. A bypass element 50 is installed in parallel with the radiator 34, with the bypass element 50 having a lower fluid resistance when fully open than that of said radiator 34. A remotely-operable bypass valve is in series with said bypass element, so that said bypass element and bypass valve are in series with each other and together in parallel with said radiator 34.

In one embodiment, a portion of the air flow is diverted from the output 14 of the turbocharger 16 (or other pressure source from the engine intake, if the engine is not turbocharged) via fluid link 70—alternately described as a tube or a passage—and is fed into the control cylinder of control mechanism 63, possibly through a calibration device 72. In the preferred embodiment, the selection of a diameter of fluid link 70 and a set of response characteristics for bypass valve of control mechanism 63 are specifically matched to the pressure from the turbocharger 16 so that changes in pressure at the turbocharger 16 will turn shaft 52 to open and close the bypass valve in bypass element 50 as precisely as desired. If the characteristics of the fluid link 70, the control mechanism 63, and the other components of the system are not specifically matched to the pressure from the turbocharger 16 to open and close the bypass valve as precisely as desired, it becomes necessary to provide calibration to the system which can be done by a calibration device 72—alternately described as a calibration valve, a calibrator, or a controller—that provides pressure or flow adjustment to obtain the proper response in the control cylinder of control mechanism 63. The calibration device 72 translates or converts signals from the sensor into instructions to operate the control cylinder of control mechanism 63.

According to the method above, the valve position is continuously updated according to changes in pressure.

In another embodiment, the method may involve a sensor which periodically measures a parameter such as manifold pressure, turbocharger output pressure, turbocharger output temperature, radiator input temperature, or similar, and electronically transmits parameter data to an electronic controller. The controller then translates the periodic parameter measurement into an input to an electronically-responsive bypass valve to open and close the bypass element. Such electronically-responsive valves are well known in the art.

The translation function involves taking input data and producing an electrical output matching the characteristics of the electronically-responsive valve. This can be done through a calibration factor using linear or mathematical calculation or by using a look-up table if the correlation between pressure change and valve opening/closing is non-linear.

In any event, as the pressure drops, the bypass valve moves in the direction of opening (i.e. increasingly or incrementally tends toward opening), and when the pressure increases the bypass valve tends to close. The result is that when pressure is decreasing the bypass is opening so that less fluid is pre-cooled before it gets to the manifold and thus heat loss is reduced and greater manifold temperature is attained.

Additionally, the system may confirm bypass valve movement by the position sensor 60 which reports valve position to the controller. If the expected position (from the translation) and the actual position from the position sensor 60 do not match, the pilot will receive a warning indication and/or the control mechanism will signal the control cylinder to adjust the position of the bypass valve until there is an approximate match.

In addition to pressure sensing, a proxy for pressure may be used such a temperature, or both pressure and temperature can be measured by sensors and fed into the control mechanism to produce the desired control cylinder movement, since these parameters directly affect each other.

Further, one may add an additional ambient air sensor to provide anticipatory data to the system. For example if the ambient temperature is particularly low, such as −50 degrees F. or less, but the aircraft is not descending, it may still be desirable to shunt more fluid away from the radiator and through the bypass. Therefore, the electronically-managed system can be used to increase bypass when ambient air is below a predetermined value or to adapt the degree of bypass in relation to changing ambient air and simultaneously adapt bypass in response to changes in pressure as explained above.

The description of the invention and its applications as set forth herein are illustrative and are not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

That which is claimed is:

1. A method of using an engine, the method comprising:
    opening a bypass valve of a bypass element of a heat exchanger of the engine in response to a decrease in a fluid pressure in a fluid link located and extending between an output of a turbocharger of the engine and a control mechanism of the bypass element, the fluid link distinct from the bypass element and in fluid communication with a pneumatic ram cylinder of the control mechanism through a calibration valve, the calibration valve in series between the pneumatic ram cylinder and the output of the turbocharger and configured to adjust the fluid pressure, the control mechanism comprising the pneumatic ram cylinder, the fluid pressure in the fluid link equal to an outlet pressure of the turbocharger; and
    closing the bypass valve in response to an increase in the fluid pressure in the fluid link.

2. The method of claim 1, wherein the calibration valve translates one of an air temperature input and an air pressure input for the control mechanism to control the operation of the bypass valve, the bypass valve being configured to increasingly open when a value of the one of the air temperature input and the air pressure input decreases.

3. The method of claim 1, wherein the heat exchanger comprises a position sensor connected to the bypass valve for monitoring actual valve position.

4. The method of claim 3, further comprising comparing an input from the position sensor to one of the air temperature input and the air pressure input.

5. The method of claim 4, further comprising adjusting a position of the bypass valve when a position of the bypass valve as determined from the at least one of the air temperature input and the air pressure input is not substantially the same as a position of the bypass valve according to the position sensor.

6. The method of claim 4, further comprising initiating a warning if a position of the bypass valve as determined from the one of the air temperature input and the air pressure input is not the same as a position of the bypass valve according to the input from the position sensor.

7. The method of claim 3, further comprising comparing an input from the position sensor with at least one of a manifold pressure input, a turbocharger output pressure input, a turbocharger output temperature input, and a radiator input temperature input and, if a position of the bypass valve as determined from the at least one of the manifold pressure input, the turbocharger output pressure input, the turbocharger output temperature input, and the radiator input temperature input is not the same as a position of the bypass valve according to the input from the position sensor, determining the position of the bypass valve according to the input from the position sensor.

8. The method of claim 1, further comprising adjusting the bypass valve in direct response to changes in a parameter from the following group: manifold pressure, turbocharger output pressure, turbocharger output temperature, and radiator input temperature; such that the bypass element is increasingly open when said parameter is decreasing and the bypass element is increasingly closed when the parameter is increasing.

9. The method of claim 1, further comprising opening the bypass valve in response to an ambient temperature measurement falling below a predetermined value.

10. The method of claim 1, wherein the pneumatic ram cylinder operates the bypass valve by the pressure in the fluid link.

11. The method of claim 1, wherein an upstream end of the fluid link is upstream from an upstream end of the bypass element.

12. The method of claim 11, wherein the fluid link is stationary with respect to the bypass element.

13. The method of claim 1, wherein the fluid link is stationary with respect to the bypass element.

14. A method of using an engine, the method comprising:
    opening a bypass valve of a bypass element of a heat exchanger of the engine in response to a decrease in a fluid pressure in a fluid link located between an output of a turbocharger of the engine and a control mechanism of the bypass element, the heat exchanger comprising a position sensor connected to the bypass valve for monitoring actual valve position, the control mechanism comprising a pneumatic ram cylinder, the fluid pressure in the fluid link equal to an outlet pressure of the turbocharger;
    closing the bypass valve in response to an increase in the fluid pressure in the fluid link;
    comparing an input from the position sensor to one of the air temperature input and the air pressure input; and
    initiating a warning if a position of the bypass valve as determined from the one of the air temperature input and the air pressure input is not the same as a position of the bypass valve according to the input from the position sensor.

15. The method of claim 14, wherein the pneumatic ram cylinder of the control mechanism is in fluid communication with the output of the turbocharger.

16. The method of claim 14, further comprising opening the bypass valve in response to an ambient air temperature measurement falling below a predetermined value.

17. The method of claim 14, wherein the pneumatic ram cylinder operates the bypass valve by the pressure in the fluid link.

18. The method of claim 14, wherein the fluid link is distinct from the bypass element.

19. A method of using an engine, the method comprising:
    opening a bypass valve of a bypass element of a heat exchanger of the engine in response to a decrease in a fluid pressure in a fluid link located between an output of a turbocharger of the engine and a control mechanism of the bypass element, the heat exchanger comprising a position sensor connected to the bypass valve for monitoring actual valve position, the control mechanism comprising a pneumatic ram cylinder, the fluid pressure in the fluid link equal to an outlet pressure of the turbocharger;

closing the bypass valve in response to an increase in the fluid pressure in the fluid link; and comparing an input from the position sensor with at least one of a manifold pressure input, a turbocharger output pressure input, a turbocharger output temperature input, and a radiator input temperature input; and, if a position of the bypass valve as determined from the at least one of the manifold pressure input, the turbocharger output pressure input, the turbocharger output temperature input, and the radiator input temperature input is not the same as a position of the bypass valve according to the input from the position sensor, determining the position of the bypass valve according to the input from the position sensor.

20. The method of claim 19, wherein the pneumatic ram cylinder of the control mechanism is in fluid communication with the output of the turbocharger.

21. The method of claim 19, further comprising opening the bypass valve in response to an ambient air temperature measurement falling below a predetermined value.

22. The method of claim 19, wherein the pneumatic ram cylinder operates the bypass valve by the pressure in the fluid link.

23. The method of claim 19, wherein the fluid link is distinct from the bypass element.

\* \* \* \* \*